INVENTOR.
FRITZ A. GUERTH
BY Howard J. Murray Jr.
AGENT
George J. Rubens
ATTORNEY INVENTOR.
FRITZ A. GUERTH
BY Howard J. Murray, Jr. AGENT
George J. Rubens ATTORNEY United States Patent Office 3,191,166
Patented June 22, 1965

3,191,166

TRANSDUCER APPARATUS WITH A CYCLIC OSCILLATORY MOVEMENT RELATIVE TO A STORAGE MEDIUM

Fritz A. Guerth, 50 Lori Road, Camarillo, Calif.

Filed June 26, 1962, Ser. No. 205,469
6 Claims. (Cl. 340—174.1)
(Granted under Title 35, U.S. Code (1952), sec. 266)

The invention described herein may be manufactured and used by or for the Government of the United States of America for governmental purposes without the payment of any royalties thereon or therefor.

The present invention relates in general to apparatus for processing information in magnetic data storage systems. In one embodiment, the invention relates to multi-channel recording head particularly suitable for use in arrangements where the data to be recorded is in digital form.

Certain magnetic storage systems are specifically adapted to the processing of information occurring as binary digits or bits, each such bit of data being represented by either a zero or a one pulse. Storage systems of this type are capable of recording a large number of items of information in a relatively small storage region. For example, when the storage medium is a conventional sensitized tape, it is possible to record as many as several thousand bits of data per linear inch.

Such systems, however, require that certain precautions be taken to preclude loss of resolution in the recording and/or reproduction process. Particularly, it is essential that the magnetic field be highly concentrated to minimize flux spreading, both by maintaining extremely close tolerances during the fabrication of the transducer assembly and by insuring a constant physical relationship between such assembly and the recording medium throughout the operating cycle.

It is known in the art to record a multiplicity of discrete signals on a magnetic recording medium as separate parallel tracks or channels laid down side-by-side and oriented longitudinally to the direction of movement of the storage medium. In such cases, each track or channel is dimensioned to be only as wide as is necessary to record a single bit or item of information. However, in practice the limiting factor in determining channel width is not the capability of the tape or other recording medium, but rather the ability to obtain a sufficiently high signal-to-noise ratio from the system in the face of cross-talk developed between adjacent channels due to the overlapping or interference of the respective flux fields. Principally for this reason, the use of coil-type transducers is impracticable, and so-called "single-turn" heads are almost universally employed. Many known head designs, however, require considerable amounts of driving power, and in addition are of relatively low efficiency, since a large portion of the flux field developed thereby is not concentrated within the gap and hence is not utilized for any useful purpose. Such extraneous flux fields, moreover, raise the impedance of the transducer, and may even act to interfere with adjacent components of the circuit.

It is accordingly a feature of the present invention, in one embodiment thereof, to provide a magnetic transducer in the form of a multi-channel recording head, the magnetic flux developed in each channel being so concentrated as to be almost wholly confined to that particular region of the transducer where it is effective to magnetize the storage medium and hence impress thereon the digital information to be recorded. Specifically, use is made of the magnetic flux around a conductor, this flux being highly concentrated in the region of the recording gap through the presence of ferromagnetic material which serves to greatly increase the flux density and hence the recording efficiency of the device.

In accordance with another feature of the invention, the information present in or on a storage medium may be derived by means of a single read-out head which is so arranged with respect to the storage medium that a relative cyclic oscillatory movement is developed therebetween. This movement in effect causes the head periodically to scan the storage medium transversely thereof, or, in other words, the head is caused to scan the individual channels in sequence. Associated with the movable read-out head is a commutator device which acts to periodically open a gating circuit to which the output of the read-out head is connected. This commutator device opens the gate at the proper time to feed into an output circuit the individual items of information which the read-out head has derived from the storage medium, this information thus appearing in timed sequence for subsequent utilization in any desired manner. A characteristic of the combination is that since the single read-out head and the commutator are fixed in location relative to one another, the gating operation is necessarily accurate and precise, and only those signals are read out which correspond to the instantaneous position of the commutator device at some particular instant of time.

One object of the present invention, therefore, is to provide an improved magnetic transducer.

Another object of the invention is to provide a magnetic transducer in the form of a multi-channel recording head having the ability to concentrate a developed flux field within an extremely minute region of the storage medium with which the head is associated.

A further object of the invention is to provide a multi-channel recording head in which the flux fields for the respective channels are highly concentrated through the use of a high-permeability component preferably of a ferromagnetic nature.

An additional object of the invention is to provide a magnetic transducer in the form of a multi-channel reproducing device having a read-out unit which is caused to cyclically scan all of the channels present on a storage medium and to sequentially gate the information derived from such medium into an output circuit through the use of an associated commutator designed integrally with the read-out unit and actuated concurrently therewith.

Other objects and many of the attendant advantages of this invention will be readily appreciated as the same becomes better understood by reference to the following detailed description when considered in connection with the accompanying drawings wherein.

Figure 1:
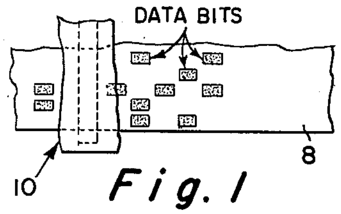
FIG. 1 is a plan view of a portion of a sensitized tape on which has been recorded data by means of a multi-channel head constructed in accordance with one embodiment of the present invention.

The present invention employs the spot magnetization technique to impress upon a sensitized storage medium discrete timed-spaced signals representing individual bits or items of information. In the usual manner, this storage medium, which conventionally is a flexible tape 8, has these data bits impressed thereon in a series of tracks which are oriented lengthwise of the tape and spaced apart in a lateral direction in a manner such as illustrated in FIG. 1.

For the sake of simplicity of illustration, this particular figure of the drawing sets forth only five such tracks, but the total number possible is limited only by mechanical and space restrictions and by the necessity of maintaining an acceptably high signal-to-noise ratio therebetween. In any event, these data bits, representing areas of tape magnetization, are developed by selective electrical energization of a recording head generally identified by the reference numeral 10. The constructional details of such a recording head will now be set forth in connection wtih a description of FIGS. 2 and 3.

It has been brought out above that it is extremely desirable to minimize the effects of stray flux fields the presence of which has been an undesirable characteristic of many conventional recording devices. Although so-called "single-turn" heads have been designed for multi-channel recording, nevertheless the close physical association of the various channel conductors has raised a problem of cross-talk which has never been completely solved. This is true even though various insulating means have been employed to prevent excessive flux spreading and to restrict the flux to the particular tape area where it serves a useful purpose. The present invention achieves a generally similar objective by extremely simple means which utilizes the inherent characteristics of a particular type of magnetic material.

Figure 2:
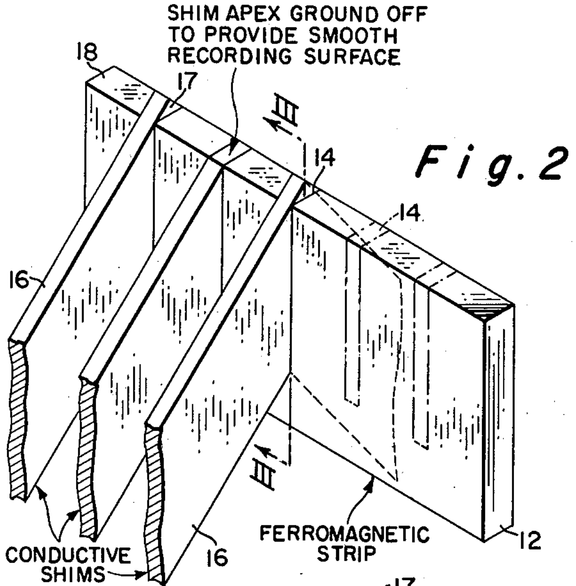
FIGS. 2 and 3 are isometric and sectional views, respectively, of one type of multi-channel recording head embodying the principles of the present invention.
Figure 3:
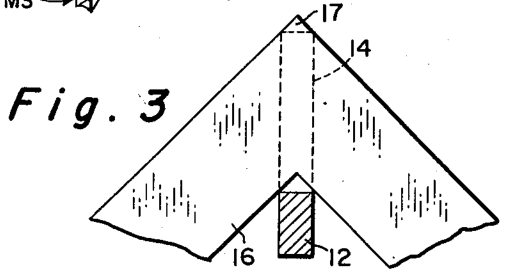

One embodiment of the present invention which has proven to be particularly suitable is illustrated in FIGS. 2 and 3. To facilitate an understanding of the constructional details of this unit, it is believed helpful to briefly set forth one manner in which such a component may be fabricated. Initially, an elongated strip-like element 12 of ferromagnetic material is processed by having a plurality of transverse slots 14 cut therein. This ferromagnetic strip, the dimensions of which are greatly exaggerated in the drawing, may for example have a thickness of 2 mils and a depth or width of approximately 15 mils. Each slot is 1 mil wide, and the spacing between adjacent slots is approximately 4 mils. The slots are cut to a depth of approximately 10 mils, or approximately two-thirds of the total width of the strip 12. The number of slots 14 which are thus formed in the strip 12 will be equal to the number of channels of information which are to be impressed upon the sensitized tape of FIG. 1.

Each slot 14 is adapted to receive therein a conductive element representing one particular channel of the information to be recorded. As shown in FIG. 2, these channel conductors are in the form of extremely flat shims 16 composed of some material such for example as brass. Furthermore, each shim 16 is angularly configured so as to have an apex or point 17 lying near the top surface 18 of the strip 12 when the shim is inserted within the slot, the relationship between these shims 16 and the slots 14 of strip 12 being clearly set forth in FIG. 3. The process by which these shims 16 are inserted in their respective slots 14 forms no part of the present invention, and, in fact, this procedure may be carried out manually if desired.

To place the assembly of FIGS. 2 and 3 in such form that it may be utilized as a recording head in the manner of FIG. 1, the entire unit is immersed in a suitable plastic compound, which is allowed to harden and form a block of insulating material within which the unit is embodied, and from which the furthest extremities of the shims 16 extend. The block is then ground by any suitable abrasive means so that the top surface 18 of the strip 12 is exposed. During this grinding or abrading operation, the apex 17 of each shim 16 is removed, so that the material of the shim lies flush with the surface 18 of the strip. This surface 18 is that portion of the assembly which will lie in contact with the storage medium 8 when the apparatus is in actual use, and which is depicted by the broken vertical lines in FIG. 1. This process of embodying the active elements of FIGS. 2 and 3 in a block of insulating material has the further advantage of precluding any relative positional displacement of these members following fabrication of the unit. It will be understood that electrical connections are then made to the outer exposed terminal portions of the respective shims 16, so that energy may be applied thereto representative of the digital information to be recorded. Purely by way of example, it has been found that pulses of as short a duration as 1 microsecond are sufficient to impress upon a storage medium (such as the tape 8 of FIG. 1) digital information of the type represented by the illustrated data bits.

It has been found in practice that the effect of the ferromagnetic material of which the strip 12 is composed is to limit the recording zone to an area on the tape 8 bounded by (1) the two oppositely-disposed surfaces of each slot 14, and (2) the two oppositely-disposed sides of the strip 12 which lie transverse to the direction in which the slots 14 are cut. In other words, the flux zone for each channel is a substantially rectangular area the boundaries of which essentially coincide with those of a slot 14 and lie within the plane of the surface 18 of strip 12. As has been brought out above, this area is 1 mil in width and 2 mils in length. Consequently, the amount of tape space utilized for recording a single digit or bit of data is extremely small, and as many as 2 million bits of intelligence per square inch of tape have been successively recorded in actual practice.

It may in certain applications be desirable to grind off or abrade the insulating plastic material within which the assembly of FIGS. 2 and 3 is embodied so that the exposed outer surface 18 of the strip 12 with which the storage medium 8 is to be in contact has a very slightly convex configuration. A close physical relationship between the head and the storage medium may be established and maintained as a result. Such configuration, moreover, facilitates the passage of the medium past the head with a minimum of friction to reduce tape wear and thus extend the useful life thereof.

Figure 4:
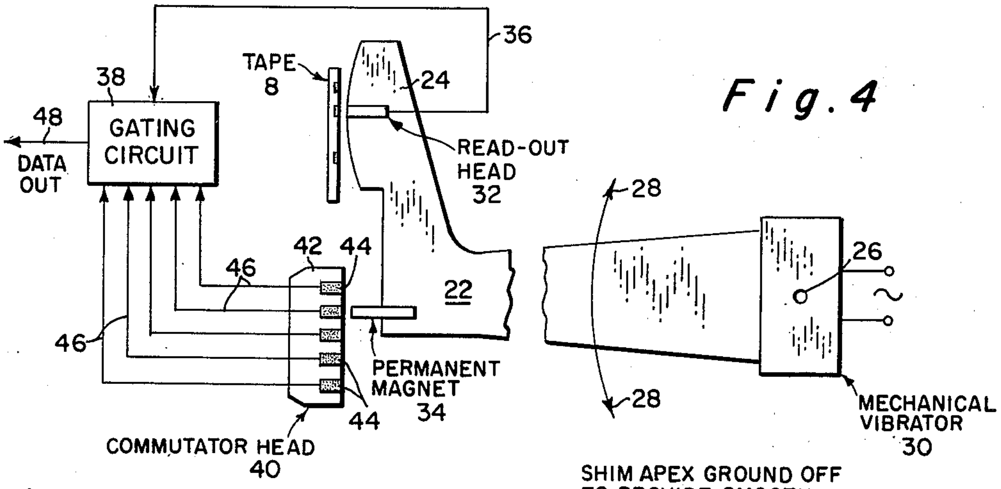
FIG. 4 is a preferred form of reproducing or read-out apparatus designed in accordance with a further embodiment of the present invention.

In FIG. 4 is illustrated one preferred form of reproduction apparatus designed in accordance with the present invention. As shown in this figure, an arm, generally identified by the reference numeral 22, is positioned so as to possess a laterally-extending portion 24 which lies adjacent the sensitized surface of the tape 8. This arm 22 is pivotally supported so as to rotate through a limited angle in either direction about a point 26. Expressed differently, the arm 22 is intended to be cyclically vibrated or oscillated in the direction of the arrows 28 by means of a suitable mechanical vibrator 30 the details of which form no part of the present invention. A particularly suitable mechanism for developing the necessary oscillatory displacement of arm 22 is set forth in a co-pending U.S. patent application by the present applicant, Serial No. 767,239, filed October 14, 1958, now abandoned.

As will be apparent from the drawings, electrical energization of the vibrator 30 will cause the arm 22 to oscillate about the pivot point 26 in the direction of the arrows 28. This will result in the arm extension 24 moving transversely of the tape 8, or, in other words, a selected point on the arm extension 24 will periodically scan across the tape 8 from side to side thereof. To utilize this scanning effect, a single read-out head 32 is carried by the arm extension 24, so that during each cycle of movement of the arm 22, the head 32 will completely traverse the tape 8 from one edge to the other.

Carried by the lower portion of the arm 22 in the position illustrated is a permanent magnet 34. This magnet 34 has a size generally corresponding to the size of the readout head 32, which in turn corresponds generally to the width of one of the channels of data impressed upon the tape 8. The read-out head 32 is electrically connected by a conductor 36 to a gating circuit 38 the function of which will be described below.

Located in the vicinity of the permanent magnet 34 is a commutator head 40 which is fixed in position with respect to the path of the tape 8, as shown. This commutator head 40 includes an insulating member 42 in which are embedded a plurality of conductive elements 44 identical to the location and spacing of the channels of information recorded on the tape 8, and the lateral relationship therebetween is as illustrated in the drawing that is, the read-out head 32 and the permanent magnet 34 are so spaced that at any instant of time the read-out head 32 is diametrically opposite a certain point on tape 8 (considered laterally thereof) and the permanent magnet 34 is diametrically opposite an exactly similar point on the commutator head 40, also considered laterally thereof. The effect of this relationship is to cause the read-out head 32 to be associated at any instant of time with one particular channel of information on the tape 8, while the permanent magnet 34 at this same instant of time is associated with that particular one of the conductive elements 34 which is representative of that same particular channel of information.

It will now be appreciated that the proximity of the magnet 34 to any particular one of the conductive elements 44 will energize one of the leads 46, and a gating pulse will be applied to the circuit 38. This gating pulse from the commutator head 40 will act to open the gating circuit 38 and allow the output of the read-out head 32 to pass therethrough to an output conductor 48.

Figure 5:
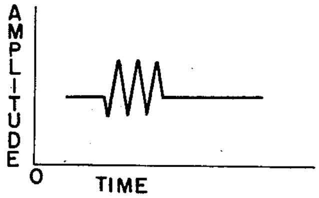
FIG. 5 is a graph illustrating a representative output signal which may be derived from the apparatus of FIG. 4.

The type of data derived from the apparatus of FIG. 4 is graphically illustrated in FIG. 5, which shows three consecutive pulses generated as a result of the passage of the read-out head 32 across three adjacent data bits (that is, across three separate channels) of the intelligence recorded on the tape 8. Since the present system is a digital one, all of the output pulses from the circuit of FIG. 4 will be of the same amplitude, and the information obtained or derived will be conveyed by the presence or absence of such a pulse.

Figures 6, 7, 8:
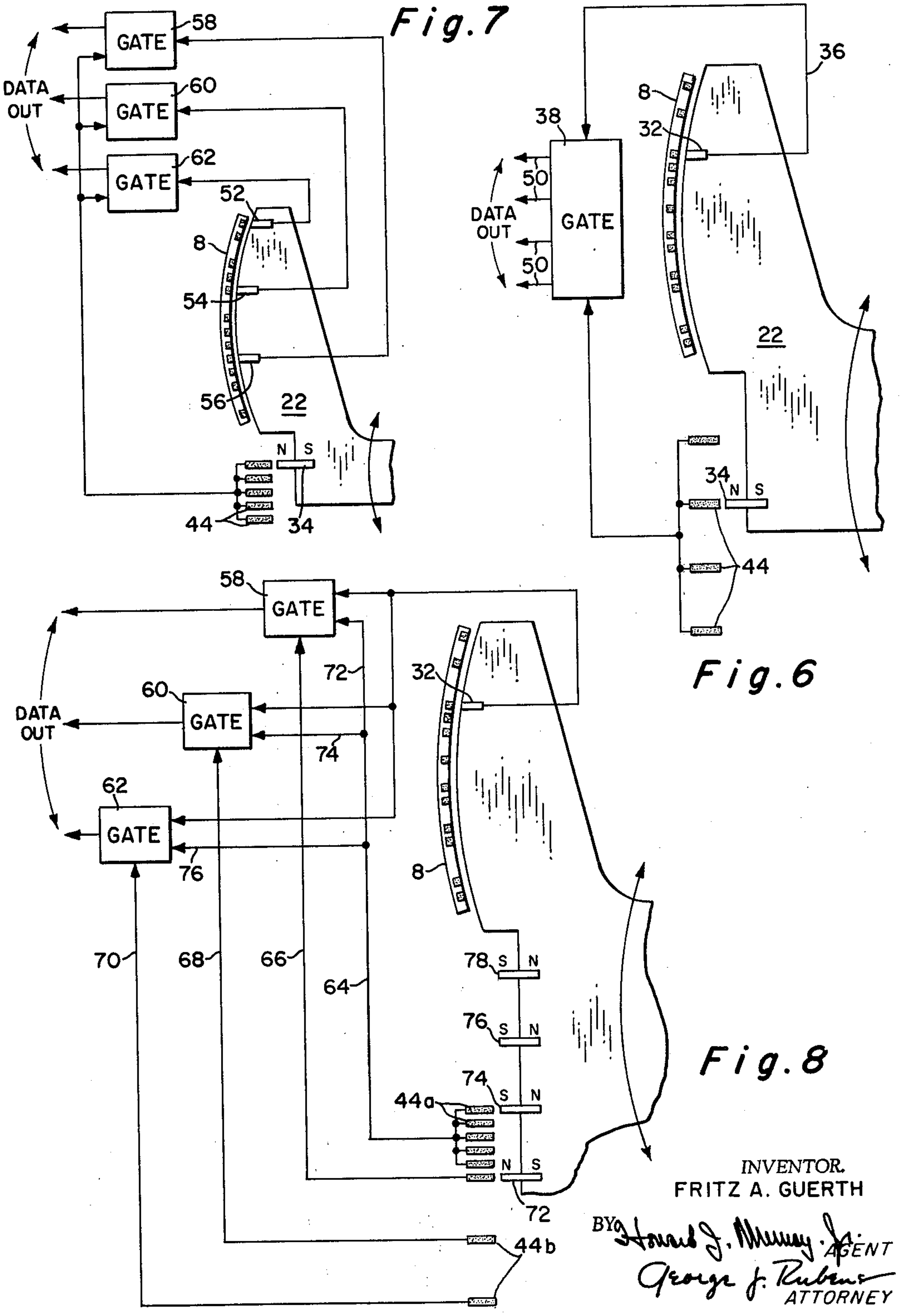
FIGS. 6, 7 and 8 are modifications of the read-out apparatus of FIG. 4.

FIGS. 6, 7 and 8 set forth modifications of the reproducing apparatus of FIG. 4. Whereas the latter is specifically designed to "gate" each successive bit or item of tape intelligence to separate output channels, the arrangement of FIG. 6, for example, employs a commutator the conductive elements 44 of which are so spaced as to trigger the gate 38 open and allow the passage therethrough of a plurality of data bits (five in the illustration) to a single output channel before the gate is again triggered to allow a further set of data bits to be fed to another output channel. Such gating circuits are well known in the art and preferably incorporate a multivibrator or "flip-flop" unit the circuit status of which is charged by reception of a pulse from one of the commutator elements 44. Four separate output channels 50 are shown respectively associated with the commutator elements 44, and five data bits (considered transversely of tape 8 in the direction of oscillation of head 32) are present in each channel or track.

FIGS. 4 and 6 employs three read-out heads 52, 54 and 56 instead of the single head 32 of FIGS. 5 and 7. Each head is associated with but a single channel, rather than, in the arrangements of FIGS. 4 and 6, the single head successively reading out the data present in all of the channels. The spacing of the commutator elements is such that the total width of the unit is equal to the width of one channel or track of tape 8. The three heads move as a unit, and the individual outputs of those heads 52, 54 and 56 are respectively applied to three gating circuits 58, 60 and 62. The output of the commutator is also applied to each of these gating circuits, and each gating circuit possesses its own particular output conductor. Thus the angle through which the arm 22 must oscillate is reduced in order to derive from tape 8 all of the data recorded thereon.

FIG. 8 may be considered a combination of the "channel gating" technique of FIG. 6 and the "data bit gating" mode of operation of FIG. 7. It makes use of a multiple commutator, the elements 44 being increased in number so that the initial group of five (considered as the head 32 moves forwardly in the drawing) consists of five data bit gating elements 44*a*. The channels are represented by channel gating elements 44*b* as shown, the data bit elements 44*a* being effective for all the chanels or tracks. To accomplish this result, the set of data bit elements 44*a*, are electrically connected together and to a conductor 64 which leads to all three gates 58, 60 and 62. The individual channel gating elements 44*b*, however, are each connected to their respective gates 58, 60 and 62 by the conductors 66, 68 and 70. The gates are designed to open when a pulse of the proper polarity from permanent magnet 72 is applied thereto. This pulse (due to its polarity) does not affect the gates when developed in conductor 64 due to the passage of magnet 72 past the data bit elements 44*a*. However, three further magnets 74, 76 and 78 are poled oppositely to magnet 72, so that the passage of any one of magnets 74, 76 and 78 past the data bit elements 44*a* does produce a series of data bit gating pulses of opposite polarity to the channel gating pulses, and the former are applied to all of the gates of the further conductors 72, 74 and 76. However, only one gate is opened at any one time by the passage of magnet 72 past the elements 44*b*, the gates incorporating flip-flop networks as before so that, as each gate is opened, the preceeding gate is closed, such designs being standard in the art to which the invention relates.

Obviously many modifications and variations of the present invention are possible in the light of the above teachings. It is therefore to be understood that within the scope of the appended claims the invention may be practiced otherwise than as specifically described. For example, although the apparatus of FIGS. 4, 6, 7 and 8 has been specifically illustrated and described in connection with the use thereof as read-out equipment, the devices are completely reversible in the sense that each unit may be employed to record the data on the storage medium and thus ensure that the information so recorded is properly positioned on the storage medium for subsequent roproduction by an identical read-out unit.

The degree of curvature of tape 8 in FIGS. 6, 7 and 8 is exaggerated in the drawing for the sake of clarity of illustration. In practice, the width of tape 8 is very small in comparison with the radius of arm 22, so that the outer extremity of the arm describes an arc which is very nearly linear. The only reason for curving the tape is to ensure a very close relationship between the sensitized surface thereof and the read-out head 32. This maintains the quality of reproduction at a high level.

I claim:

1. Magnetic read-out apparatus comprising a movable elongated storage medium on which has been recorded a plurality of channels of information, said channels being oriented lengthwise of said medium in spaced-apart relation, a pick-up head disposed contiguous to said medium, said pick-up head having a single energizable element the width of which is approximately equal to the width of one of the said channels of information recorded on said medium, a commutator head having a plurality of spaced-apart conductive elements carried thereby, the number of said conductive elements being equal to the number of channels of information recorded on said medium, said commutator head being laterally spaced from said movable storage medium so that the respective chanels of information recorded on said medium are transversely aligned with the spaced-apart conductive elements carried by said commutator head, a single permanent magnet disposed contiguous to said commutator head, the width of said permanent magnet being approximately equal to the width of a single conductive element carried by said commutator head, an oscillatable arm supporting and positioning both said pick-up head and said permanent magnet, and means for oscillating said arm at a constant frequency in a direction normal to the direction of movement of said storage medium, so that at any instant of time the single energizable element of said pick up head is magnetically associated with a particular channel of information on said storage medium and said permanent magnet is associated with that particular one of said plurality of conductive elements carried by said commutator head which is representative of the same particular channel of information, the oscillation of said arm thus in effect producing a cycle scanning at a constant frequency by the single energizable element of said pick-up head of all of the channels of information recorded on said medium and a corresponding scanning by said permanent magnet of all of the conductive elements of said commutator head which are respectively representative of such channels.

2. The combination of claim 1, further comprising an electronic gate to which is applied energy received by the energizable element of said pick-up head in scanning said medium, said gate also being connected separately to each of the conductive elements carried by said commutator head, whereby, when a particular commutator head element is energized by the proximity thereto of said permanent magnet, said gate is opened to permit passage therethrough of the energy picked up by said energizable element which energy is representative of the information in that particular channel to which said energizable element is proximate at the instant said gate is thus opened.

3. The combination of claim 1, further comprising means operating as a function of the instantaneous position of said pick-up head transversely of said storage medium for selecting from said medium information present only in the particular channel corresponding to that determined by the said instantanteous transverse position of said head.

4. Magnetic read-out apparatus comprising a movable elongated storage medium on which has been recorded a plurality of channels of information, said channels being oriented lengthwise of said medium in spaced-apart relation and each channel containing a plurality of individual data bits spaced apart transversely to the direction of movement of said medium, a pick-up unit disposed contiguous to said medium, a commutator assembly disposed laterally of said medium considered with respect to the direction of movement thereof and lying essentially in the same plane as said storage medium, said commutator assembly containing a plurality of fixed conductive elements and a movable energizing element, means for mounting said pick-up unit and the energizing element of said commutator assembly in fixed spatial relationship to one another, means for oscillating said pick-up unit and the energizing element of said commutator concurrently and at a constant frequency so that, as said pick-up unit scans said storage medium in a direction transverse to the direction of movement thereof, the energizing element of said commutator will become associated sequentially with each one of the said fixed conductive elements of said commutators, and at least one gating circuit to which the respective outputs of said pick-up unit and said commutator assembly are both applied.

5. Apparatus according to claim 4 in which the number of fixed conductive elements of said commutator is equal to the number of channels of information recorded on said tape.

6. Apparatus according to claim 4 in which the number of fixed conductive elements of said commutator is equal to the number of individual data bits contained in one of the said channels of information, considered in a direction transverse to the direction of movement of said medium.

References Cited by the Examiner

UNITED STATES PATENTS

| | | |
|---|---|---|
| 2,813,259 | 11/57 | Burkhart. |
| 2,986,725 | 5/61 | Dirks. |
| 3,012,232 | 12/61 | Eckert et al. |
| 3,078,351 | 2/63 | Granqvist. |

OTHER REFERENCES

Thorpe: Multi-Channel Magnetic Recording Head, IBM Technical Disclosure Bulletin, vol. 3, No. 10, March 1961, page 32, 179–100.2.

IRVING L. SRAGOW, *Primary Examiner.*